United States Patent
Foladare et al.

(10) Patent No.: US 8,260,665 B2
(45) Date of Patent: *Sep. 4, 2012

(54) SYSTEM AND METHOD OF PROVIDING TARGETED ADVERTISEMENTS FROM SUBSCRIBERS OF DIRECTORY SERVICES

(75) Inventors: Mark J Foladare, East Brunswick, NJ (US); Richard L Bennett, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,338

(22) Filed: Oct. 21, 2011

(65) Prior Publication Data

US 2012/0035995 A1 Feb. 9, 2012

Related U.S. Application Data

(63) Continuation of application No. 12/035,202, filed on Feb. 21, 2008, now Pat. No. 8,065,185.

(51) Int. Cl.
*G06Q 30/00* (2012.01)
(52) U.S. Cl. ..................................... 705/14.5
(58) Field of Classification Search .............. 705/35–42, 705/1.1, 14, 14.5
See application file for complete search history.

(56) References Cited

U.S. PATENT DOCUMENTS

| | | | |
|---|---|---|---|
| 6,298,218 B1 * | 10/2001 | Lowe et al. | 455/66.1 |
| 7,024,211 B1 * | 4/2006 | Martin | 455/466 |
| 7,698,236 B2 * | 4/2010 | Cox et al. | 706/12 |
| 7,861,260 B2 * | 12/2010 | Shkedi | 725/34 |
| 2002/0087335 A1 * | 7/2002 | Meyers et al. | 705/1 |
| 2002/0102993 A1 * | 8/2002 | Hendrey et al. | 455/456 |
| 2002/0147638 A1 * | 10/2002 | Banerjee et al. | 705/14 |
| 2005/0038698 A1 * | 2/2005 | Lukose et al. | 705/14 |
| 2005/0245271 A1 * | 11/2005 | Vesuna | 455/456.1 |
| 2006/0212350 A1 * | 9/2006 | Ellis et al. | 705/14 |
| 2006/0224447 A1 * | 10/2006 | Koningstein | 705/14 |
| 2006/0242012 A1 * | 10/2006 | Agarwal et al. | 705/14 |
| 2006/0286989 A1 * | 12/2006 | Illion | 455/456.3 |
| 2006/0287915 A1 * | 12/2006 | Boulet et al. | 705/14 |
| 2007/0022032 A1 * | 1/2007 | Anderson et al. | 705/35 |
| 2007/0072591 A1 * | 3/2007 | McGary et al. | 455/414.1 |
| 2007/0073585 A1 * | 3/2007 | Apple et al. | 705/14 |
| 2007/0179359 A1 * | 8/2007 | Goodwin | 600/300 |
| 2008/0004953 A1 * | 1/2008 | Ma et al. | 705/14 |
| 2008/0027799 A1 * | 1/2008 | Hao et al. | 705/14 |
| 2008/0081640 A1 * | 4/2008 | Tran et al. | 455/456.3 |
| 2008/0086360 A1 * | 4/2008 | Kanapur et al. | 705/10 |
| 2008/0097836 A1 * | 4/2008 | Silanto et al. | 705/14 |

(Continued)

OTHER PUBLICATIONS

Morissey, Brian, "Marketers Enlist Mobile Phones as Utility Vehicles", Adweek, Nov. 26, 2007; 48, 43; pp. 1-2.*

(Continued)

*Primary Examiner* — Ella Colbert
*Assistant Examiner* — Mohammad Z Shaikh

(57) ABSTRACT

Disclosed are systems, computer-readable medium and a method for delivering advertisements to user devices. The method includes storing first data associated with online and physical activity of plurality of customers, storing second data associated with current status of plurality of advertisers, matching a customer with an advertiser based on analysis of the first data and the second data and delivering an advertisement to a device associated with the matched customers online and physical activity. The on-line and physical activity is captured by a plurality of devices including a mobile device via a plurality of sensors.

20 Claims, 6 Drawing Sheets

U.S. PATENT DOCUMENTS

| | | | |
|---|---|---|---|
| 2008/0109309 A1* | 5/2008 | Landau et al. | 705/14 |
| 2008/0109317 A1* | 5/2008 | Singh | 705/14 |
| 2008/0133336 A1* | 6/2008 | Altman et al. | 705/10 |
| 2008/0182590 A1* | 7/2008 | Ruckart et al. | 455/456.3 |
| 2008/0227467 A1* | 9/2008 | Barnes et al. | 455/456.2 |
| 2008/0242231 A1* | 10/2008 | Gray | 455/66.1 |
| 2008/0300109 A1* | 12/2008 | Karkanias et al. | 482/8 |
| 2009/0043657 A1* | 2/2009 | Swift et al. | 705/14 |
| 2009/0089166 A1* | 4/2009 | Happonen | 705/14 |

OTHER PUBLICATIONS

O'Loughlin, Sandra, "Asics America Effort Hits the Ground Running", Brandweek. New York: Jan. 16, 2006. vol. 47; Iss. 3; p. 6, 1 pgs.*

Gray, Audrey, "Connecting to New Sales", Dealerscope. Philadelphia: Feb. 2008. vol. 50, Iss. 2; p. 76, 1 pgs.*

Business Editors/ High Tech Writers, "MatchLogic Introduces Intelligent Targeting Service", Business Wire. New York: Oct. 6, 1998. p. 1.*

"All the young dues: the gulf between traditional media and young men continue to widen as the on-demand world caters to the demographic's need", Media Week, Sep. 5, 2005, v15, n 31, p. 16.*

Petrecca, Laura, "Cyber winners had strong connection; Nike, Unilever, Diesel take honors", USA Today. McLean, Va: Jun. 21, 2007, p. B.5.*

Petrecca, Laura, "Cyber winners had strong connection; Nike, Unilever, Diesel take honors," USA Today, McLean, VA, Jun. 21, 2007, p. B.5.

"The Mobile Media Review: Mo' Betta Mags, Mo' Betta Ads, Mo' Betta Search, Mo' Betta Music," Wireless Business Forecast, Potomac, Nov. 30, 2007, vol. 3, Issue 23.

Morrisey, Peter, "Marketers Enlist Mobile Phones as Utility Vehicles", Adweek, Nov. 26, 2007, 48, 43, p. 10.

Anonymous, "Trimble: Trimble Offers Free Geocaching Application for GPS-Enabled Nokia Mobile Phones," Internet Weekly News, Atlanta, GA, Feb. 18, 2008, p. 5.

Gray, Audrey, "Connecting to New Sales", Dealerscope, Philadelphia, PA, Feb. 2008, vol. 50, Issue 2, p. 76.

* cited by examiner

SYSTEM AND METHOD OF PROVIDING TARGETED ADVERTISEMENTS FROM SUBSCRIBERS OF DIRECTORY SERVICES

PRIORITY INFORMATION

The present application is a continuation of U.S. patent application Ser. No. 12/035,202 filed Feb. 21, 2008, the content of which is included herewith in its entirety.

BACKGROUND OF THE INVENTION

1. Field of the Invention

The present invention relates to advertising a user device, more specifically to a system and method of tracking and mapping customer analytics across multiple screens to match advertisements from subscribers of directory services with customers.

2. Introduction

Companies such as Google® and Yahoo!® have made a business of tracking customer searches and selling advertisements to customers based on that model. It is well known that television stations make money selling target advertising for various shows although they do not know who specifically is watching any particular show. Certain rating procedures are commonly used to gather data about characteristics of the individuals that watch particular shows to aid advertisers in targeting their ads as well as their cost structures. However, there is still much uncertainty in the quality of consumer data and whether television advertising matches the intended consumer group to its maximum potential.

Cell phones are being improved wherein the owner of the phone may be known and some phones may provide a mobile television capability but they may not know specific details about the customer patterns. With the implementation of more advanced cell phone and portable devices as well as an improving ability to identify about user's buying habit, what is needed in the art is an improved system and method of using known data about the customer to target advertisements to a particular customer.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and computer-readable media for providing advertisements to user devices. An exemplary method of the embodiment includes storing first data associated with online and physical activity of a plurality of customers, storing second data associated with current status of a plurality of advertisers, matching a customer with an advertiser based on analysis of the first data and the second data and delivering an advertisement to a device associated with the matched customers online and physical movement activity. The first data may be gathered through multiple devices and/or a mobile device as user interaction with the device(s) or some other sensing mechanism such as GPS and so forth.

An example of an application of the invention is the following. Assume a person is browsing for a new car and they receive on their portable device an advertisement from "Bob's Ford" as that person is driving past the dealership. The advertiser is a subscriber of directory services from entities such as yellowpages.com. The advertisement can actually provide directions to that dealership or a welcome to stop in while they are in the neighborhood. Since a direction of travel may be known about the user, the advertisement might know to say "Turn right in 2 blocks." The ability of providing such a focused advertisement is based on the ability to match the advertiser (Bob's Ford) with the consumer as well as with other ancillary data. When the advertiser is a subscriber to a directory service such as yellowpages.com, the information about the subscriber such as their location, their products, their advertising strategy, and so forth enables a networking company to utilize that information as well as other information about the user such as the ability to understand that the user has been browsing for cars and is driving through a certain neighborhood, to match up the advertiser with the customer. This advertising may be done either via a portable device of the user or may also be inserted in, if the timing is appropriate, to a particular time slot through the standard AM/FM radio or satellite radio of the user. Previously, the user would have perhaps been driving through the appropriate neighborhood but the advertiser (Bob's Ford) may have placed an ad just in general in an advertising slot on the radio or on her IPTV during a scheduled commercial time based on which may or may not have been convenient for the specific location of the user being near the dealership. The invention utilizes information drawn from the IP Multimedia Subsystem (IMS) and combines the technologies drawn therefrom with yellow page type technology and data regarding subscriber businesses such as location, current inventory, and so forth with information about who is looking for the particular products and services of a business. It is assumed that one of skill in the art understands the IMS system. Several references to this system include the 3G IP Multimedia Subsystem (IMS), Merging the Internet and Cellular Worlds, by Camarillo and Garcia-Martin, Wiley 2006 and the IMS IP Multimedia Concepts and Services, by Poikselka, Mayer, Khartabil, and Neimi, Wiley, 2006.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
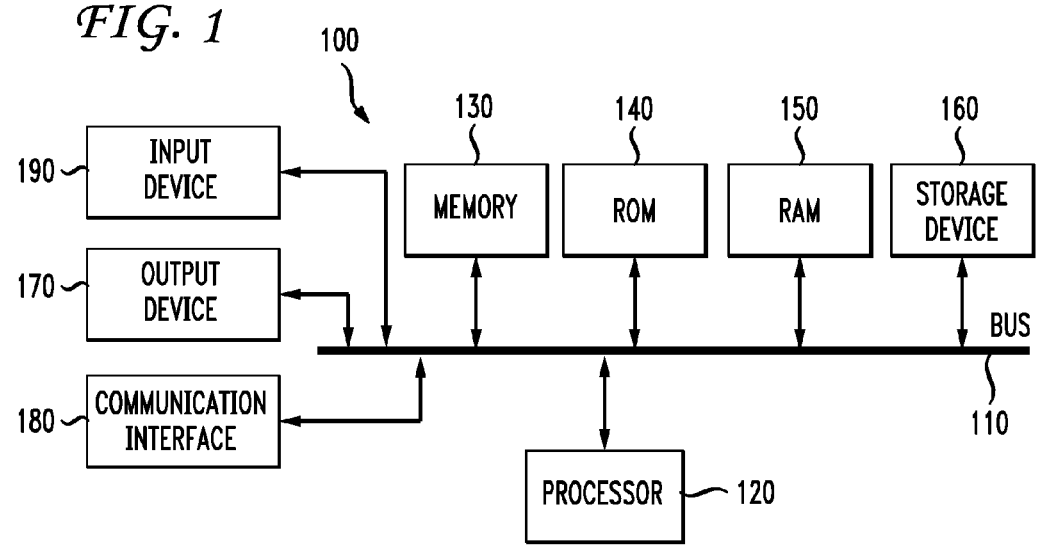
FIG. 1 illustrates a system embodiment of the invention.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual modules functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided. But, it is understood that a system, device or apparatus embodiment, which may include various modules or blocks, is not software per se but requires each module or block to encompass software controlling one or more hardware components such as a CPU and/or a display.

Figure 2:
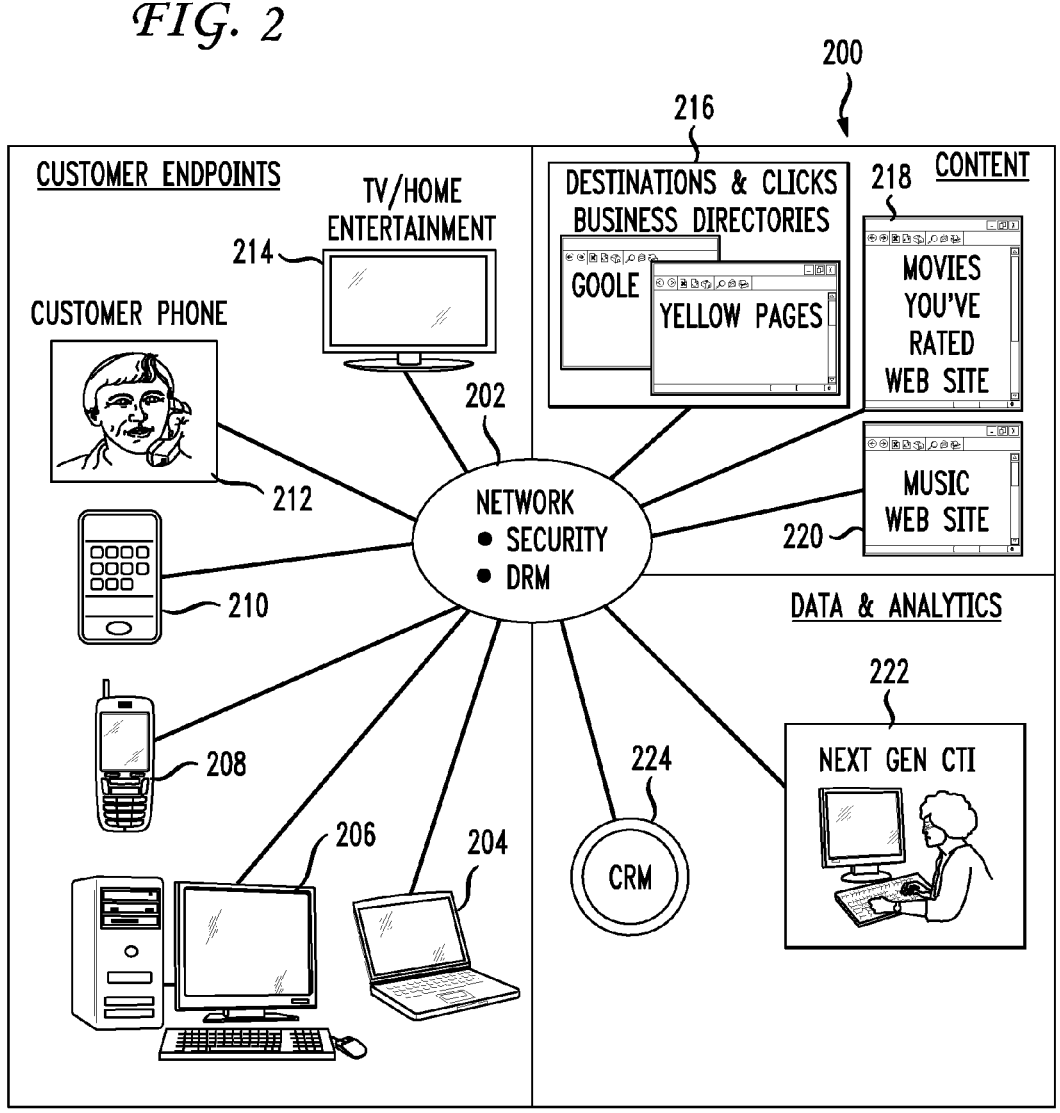
FIG. 2 illustrates the general network associated with the invention.

As noted above, the IMS basic information about a user may be identified from the IMS system. FIG. 2 illustrates a network 200 which includes various components. For example, in the customer endpoints section there are a variety of potential endpoints which may communicate with a network 202 which includes security and DRM services. For example, television home entertainment systems 214, a customer phone 212, a handheld PDA 210, a portable phone 208, a home computer 206 or a laptop computer 204 may all communicate with a network 202. Similarly, feature 216 illustrates the destination in clicks which may include business directories such as Google or Yellow Pages. The user's interaction with these various web pages may illustrate how a browser or a portal may be used to track customer interest in products much like Yahoo and Google do today. There may be content which may be received through websites such as Netflix which can identify movies you have rated or seen 218 or music you have listened to 220. The data associated with this information is also available in the network 202. By various network devices being registered with an IMS system, the system may use the customer ID from an IPTV or other device and may know what the customer is watching. Specific times or during a commercial, the system can direct specific customer content to them. In addition, if the customer uses a cell phone 208 as a channel changer or content controller in, for example, a home entertainment system 214, then the system may know via the IMS system what this specific person is watching. For example, two siblings may each have a cell phone that can be used to control the T.V. We know the person and location of the mobile user as well as the programming they may be watching. The system will also know the location of a Yellow Page advertiser 216 and many details about their business. By combining all this information and performing network analytics, the present system enables advertisers to provide focused advertising to customers who both show an interest and may either be living or traveling through an area.

Figure 3:
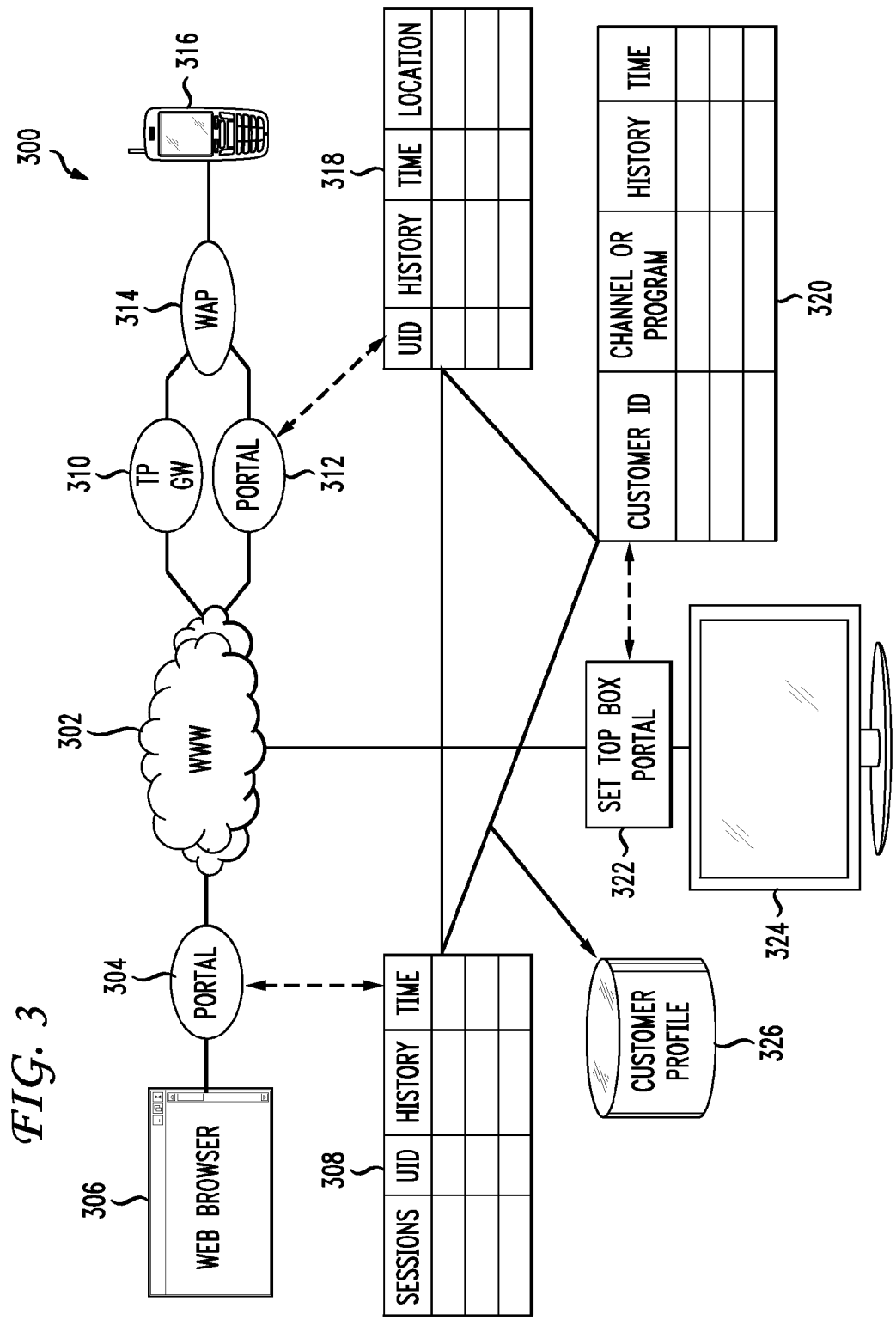
FIG. 3 illustrates further details regarding network elements associated with the invention.

Also shown in FIG. 2 are the customer relationship mannagement node 224 and next generation CTI analytics 222 which organize this information together to provide the targeted advertising. FIG. 3 illustrates further details about creating a user profile. Data is stored in a customer profile database 326, which can be captured from a portal such as a web browser 306 or correlated to a set top box portal 324 and or the mobile device portal 316. The customer profile may also provide granulated links of information. For example, the system can show what products the user purchased but not show all of the websites they visited in route to purchasing a certain product. The user is in control and is willing to give up certain private information for their benefit, but the system supports the ability to be in control of how much information is processed. An entity or system that provides the functionality herein may or may not ask for permission or interaction from the user in order to provide the particular granulated level of information with regards to a user's habits or physical movement in terms of providing information to a customer profile and to advertisers for determining what advertisements to push to the customer. Thus, in one aspect, an entity may seek permission from the customer in terms of the privacy related data that it receives and in another aspect the entity may not ask for such permission.

A household of people of course would preferably be known in the portal associated with the web browser 306 associated with a common computer in the home and/or the set top box 324/322. The location and information about an individual is primarily known via a mobile device portal associated with mobile device 316. Where the individual device 316 can be used as a remote control for a set top box portal 322/324, the system may also known who is watching a television program as well as information collected at the web portal 306 can be used to gain information on each exact individual as well. The system builds and continuously updates the profile database 326 such that the customer database knows the individual interest and present location and real-time behavior (such as being on the phone, watching TV, and where such information is stored in various databases 308, 318, 320).

For example, the web browser provides a portal 304 that updates information such as the sessions, the user ID, the history and the time. The World Wide Web 302 is also in the center of providing communication between these various elements. A portal 312 may be used to communicate information via a WAP 314 protocol (or other type protocol as would be known in the art) between mobile device 316 and a database 318 of user ID history time and location information. Database 320 may store information from a set top box portal 322 which may include customer ID, the channel or program watched, the history and the time and so forth. All of these various databases of information may also feed information to the customer database 326. The through a network such as network 300, such as is shown in FIG. 3, the system has the ability to capture and register customer behavior and location data in real-time via TV, mobile and broadband networks.

Figure 4:
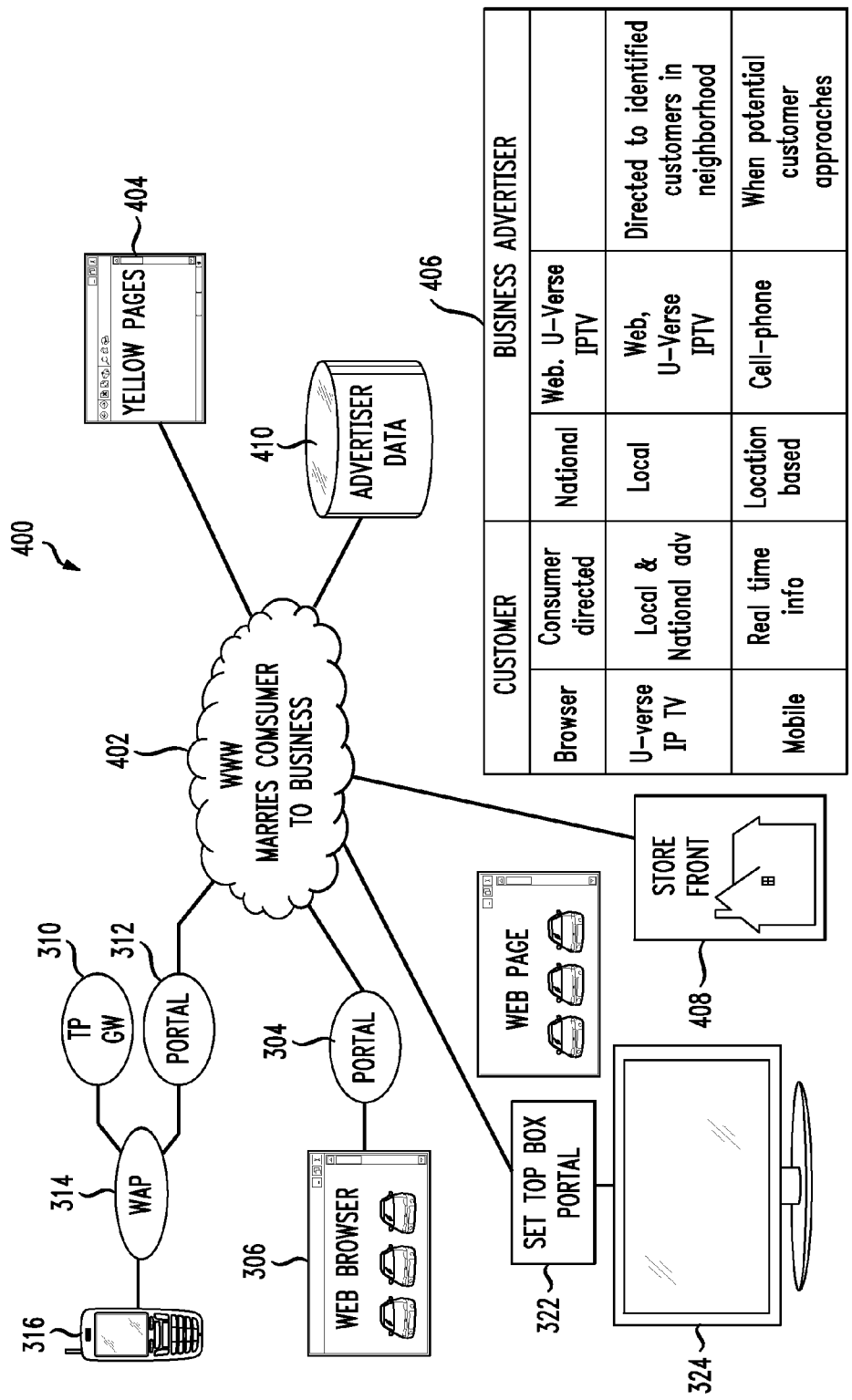
FIG. 4 further illustrates various network aspects of the invention.

The network 400 shown in FIG. 4 illustrates an example mechanism for matching a customer with a business advertisement. Businesses advertise through websites such as yellowpages.com 404. This may provide information on their industry, information on current services and suppliers, location and so forth. Database 406 may include such business advertiser information such as their particular advertising goals, advertising information with regards to national, local or location based advertisements, the actual advertisements which may be presented in various contexts such as a web browser 306 or a portable device 316 or through a set top box portal 322/324. An advertiser profile filter database 410 is established which may include much of the same types of information essentially providing all the details about particular advertisers. The advertiser database may also contain customer profile filter information. For example, the advertiser information may be less about the advertiser per se and more of a filter for customer profile attributes that differentiate customers that will be more interested in a particular business or advertiser. In this regard, the advertiser profile can refer more to a filter criteria for types of customers, the types of demographics that they are interested in targeting information for and so forth. Data from the customer with regards to product interest, current behavior, historical on-line and/or physical activity and current location may also be stored in the database 406 which information may be broken down based on a particular customer and information from a browser 306, an IPTV on a portable device such as a set top box portal 322 or data from mobile device 316. As is shown, the mobile device may communicate through a WAP 314 or other protocol, through a portal 312 to the world wide web or through a TP Gateway 310 to an IMS system. Similarly, the web browser 306 communicates through portal 304 to the World Wide Web 402 and with the other various aspects of the network shown in FIG. 4. There also may be a communication from a store front 408 with the World Wide Web which may provide further information with regards to the particular advertiser profile filter 410. Such data from the customer with regards to product interest, historical activity, current behavior and/or current location may be matched via a database 406 to an optimal business client. The information is derived from multiple devices (cell, PC, TV, etc.) that includes mobile devices to capture data on where a person is or their historical location information. An optimal business client may utilize information about various businesses (for example, various car dealers in the area) and the willingness of the business to pay for the service as well as the ideal location and interest of the customer. In this regard, when the system matches a chosen business with a particular user or customer, an offer can be made to the business customer to do several things.

First, the offer may include the offer to sell a mobile advertisement that is sent directly to the user that is a targeted customer based on the current location. For example, the location may relate to whether the customer mobile device is within 500 yards of the store and moving at a speed which indicates that they are walking or driving. If the speed is indicated at 60 miles an hour, then there may be an identification that the user is in a car and not likely to stop based on the direction they are going and how far away they are from the dealer. However, if the location information identified that they are traveling at 2 miles an hour and the likely location is along a side walk, then an advertisement may be sent to them. Advertisements may be sent to both the walker and the driver but at different rates because of the reduced likelihood that the driver will stop. Next, an offer may be made to sell an IPTV advertisement targeted directly to the customer based on interest in the product and frequency of that customer's mobile device having passed the store. Thus, if the system identifies that the customer has passed the advertiser's relative location a certain amount of times, within a short period of time, then the system would send an IP advertisement to their set top box portal 322.

Another option may be to sell advertising across to web browser based on both home location, which is known data from a data modem and an IPTV, and a mobile location based upon tracking of the cell phone location relative to the advertiser's location.

Figure 5:
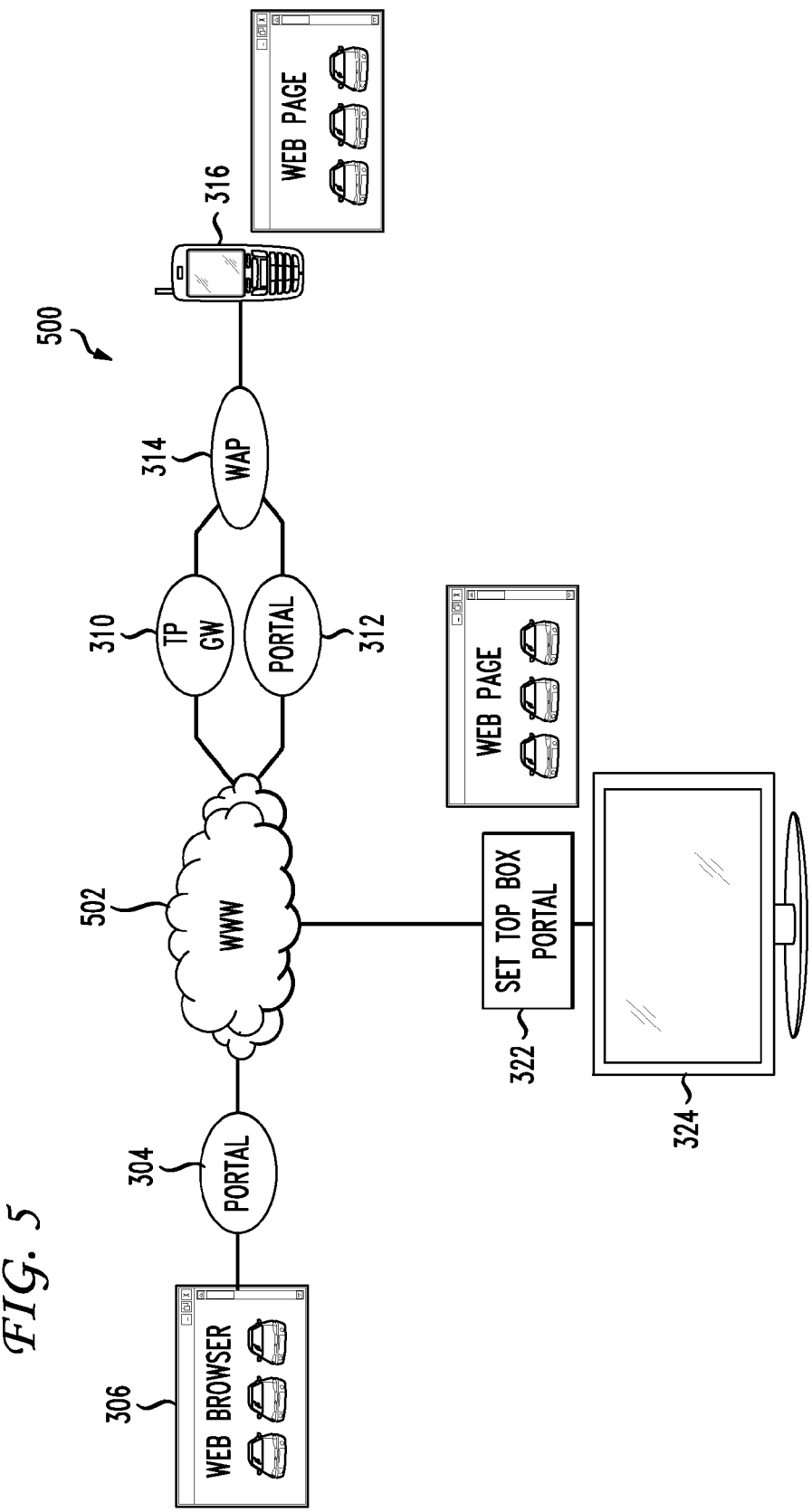
FIG. 5 illustrates a further aspect of network elements associated with the invention.

We note that customized commercials can be placed both on the IPTV 322 and a mobile device 316 (which of course equals any mobile device such as a PDA or a cell phone and so forth) which can receive a message with an advertisement or both. FIG. 5 illustrates another aspect of pushing an advertisement to the subscriber. For example, as has been noted above, the system can know or learn who is browsing a web site 306 via a portal 304 which identifies a location and perhaps a user and their habits which are communicated to the World Wide Web 502. Using that information, the system can push local advertisements, coupons or maps to a user device 316 when a user enters a neighborhood. Thus, a web page is shown as including cars and details regarding sales on cars and so forth to device 316 which may be communicated to a device through a portal 312 and/or a TP Gateway 310 using a protocol such as WAP 314 protocol. Similarly, the system may also send direct advertising programs to a television station or to an individual via a set top box portal 322 or watching on a TV 322. Also shown as a web page which includes a representation of the advertisement.

A benefit of the approach disclosed herein is that the company can sell direct personalized advertising to those who are in the particular location to potentially buy and have shown an interest or a potential need in the advertised subject matter. In addition, the information is collected passively so active primary market research is not needed to find out how to reach a target audience. Analytics will instruct the advertiser what advertising will work best with which shows or media presentations and which could potentially do better than that by providing, during the advertising segment, customized advertisements to that specific customer based on a particular location such as the home or the phone and their interest based on the analytics. Data regarding customer needs may also be drawn from sensing devices in appliances such as refrigerators, stoves, cars and so forth that communicate to the network. Information from sensing devices in various appliances may be pushed to a central location by the appliance itself or may be pulled via a request from a device external to the appliance. Sensing devices may transmit information continuously or periodically, such as every 24 hours or every 30 days. Therefore, when the engine check light comes on, that data may be sent to the network which a local repair shop may have an opening and want to offer a checkup.

As another example, assume that Julie has searched online for a prom dress. The system knows that her parents have given her a cell phone and that she watches a particular show such as The Gilmore Girls because she uses the cell phone as the remote control on her IPTV. Even if Julie did not use the cell phone as a remote, the system can figure out if she was the one watching based on probabilities of what she is likely to watch and that she is likely the only person in the house to watch The Gilmore Girls. The local dress shop, a Yellow Pages advertiser or a company that has registered for advertisements, can send directed commercials during the commercial break session to Julie and a coupon to her cell phone every time she gets within 500 yards of the shop. Note that a company managing this entire process would need to use the IP network to send individuals their personal commercials during the commercial break time slot rather than transmitting a general commercial like standard cable company advertisements.

Similarly, Julie's father, who has been web surfing for cars, may get a particular Toyota commercial customized to the models he's been looking at and a sales person can send him a card with a coupon every time he drives by the dealership.

Accordingly, one of the reasons why IPTV provides improvements for advertisers over cable TV is the use of the customer knowledge which is in real-time and can provide a complete data sample for a customer base. The system can track who is watching programming, for how long and so forth. Both geographic and demographic details may be provided. Thus, while cable customizes advertising to a particular channel in a location area based on demographics, IPTV provides the ability to push advertising campaign to a particular set top box if desired. Thus, the present invention enables a location-based, intelligent advertising approach for businesses. This finally provides a way to target and reach out to the customer as the customer approaches the store front. Available modes of communication include a TV, personal computer, voice communication, instant messaging, short message servicing (SMS), emailing and so forth. Thus, the customers real-time behavior and availability which includes possibly what they are searching, their search history, what time their devices were connected to the system such as a TV and a cell phone, what the customer is watching, who are the customers and the location of the customers may be matched with historical and data analytics to the business.

In yet another example, a business knows their desired customers, their location history, their content distribution history, their business customers and public data related to a customer as well as their advertising and business directory information associated with the business customer and advertising data. Accordingly, the business can make selections and determinations based on organized parameters for identifying demographics, availability and location, and a current communications mode to push the improved targeted advertisements to a user. As an example, assume that the user has been surfing the web for bedroom furniture, that information would end up in the customer profile data so the next time the user drives to the mall, the Yellow Pages database may have a number of different advertisers but instead of picking a car dealer the system may determine you are interested in furniture and will pick the RoomStore® because of both my location and the user's previous searching on the web indicates such an interest. The system will then send an advertisement for a bedroom set that is good for two hours and $200 off. One aspect of the invention, the system will send an alert to the bedroom set store giving them the details of the customer, their level of interest and request whether the RoomStore wants to send them an add now. There may be an option at this point to negotiate a price in which the store determines what price they would offer a product or service or the system may negotiate a price with the user over their cell phone. Also, based on the history of the customer, the system may prioritize what is the most likely interest or product that they would likely buy first. Thus, if the user had casually browsed at a Ford® dealership on the web but then included very intense browsing of furniture web sites then the system may determine that there is a very high value furniture advertisement that could be sent but if they turn that down, then the system may return to the next most likely advertisement which would be for a Ford dealership. In this regard, the system includes a list of potential advertisers that are mapped to what is most likely and appropriate for the customer. With regards to the business profiles and the particular business advertisers filter, there are various kinds of parameters that may be dynamically adjustable. For example, a particular company's interest in sending a particular ad to somebody may not be static. There may be running specials that change parameters in their profile that may make them want to pay more for the ad now because of what is going on in their business. Or perhaps their advertising budget may be higher one month from the next. In this regard, their business filter profile may be dynamically adjusted based on day-to-day, week-to-week or month-to-month aspects of the business.

Therefore, the data associated with a customer that is walking by a business may change day to day. Presenting an advertisement to that user may occur on that day whereas the next day the business profile may change because particular changes occurred in the business. The system may also be automatically set up based on what parameters are desired for negotiating advertising so that a representative of the business may not physically respond to an inquiry to an advertisement. In other words, there can be a software program that already indicates whether the business will want to respond and pay for a particular customized advertisement. For example, suppose that data associated with the business may be related to inventory. Thus, if a user has been searching the internet for bunk beds and then walks by the RoomStore, if the database of inventory for the RoomStore indicates that they are out of bunk beds then the system would decline an advertisement to the user based on the availability of the product, but could offer the customer a $200 off coupon valid starting the day of the next scheduled shipment of appropriate bunk beds at the RoomStore. Thus, the customer profile can be mapped to their inventory which enables either advertisements to be turned down or additional advertisement to be pushed for a particular piece of inventory. For example, if there is an over supply of bunk beds, then there may be advertisements pushed for individuals both looking for bunk beds as well as children's beds.

In another example, assume that a user is a subscriber to the New York Times® online and that they have also been browsing and have a specific interest in certain products such as furniture. Instead of on the cell phone or on the TV set the system could also do advertisement placement within a particular website, such as the New York Times online. In this regard, the system may also do the negotiation with a particular website to determine whether they want to offer that as a service and have a dual cookie, such that the system can match the two of them up and give the New York Times a particular portion of the advertising revenue.

In this regard, a cookie is stored in the network versus on the personal computer such that the New York Times is an advertiser who agrees on doing this type of advertising for its readership. As long as the user is logged in and has a cookie in the network, that browser can present to the user certain kinds of advertisements. While cookies are clearly already used, what they fail to do is not provide particular advertisement. If the cookie according to the present invention is used, it can basically track where the user has been browsing certain and can query a particular website such as the New York Times online to match the New York Times with advertising space and a particular furniture store or other business. In one aspect, a system may refer to a service provider that offers a service that embodies this invention and is trusted to act on behalf of both the customer and business in ways that they consent to and mutually benefit from. The service provider may use explicit or implicit information that customer or business allows but the information is protected, used only on their behalf, according to provided policies as a service provider may mediate. The system can become a match maker between the advertiser and customer because of the knowledge about the interest of the user and the desire of the New York Times to provide target advertising online for their users.

In the embodiment of the system acting as a service provider or a mediator, one example method includes establishing a policy with regards to a particular customer, a business and/or a combination of both entities that relates to the amount and type of information a customer is willing to share in order to receive advertisements according from an advertiser. The method further includes the service provider in the process of assisting and mediating between the customer and the advertiser, enforcing that policy with regards to how much information is received from the customer and their habits and communicated through the advertiser. In this regard, one aspect may include wherein the service provider receives a large amount of information that may include click web surfing habits, location-based information, shopping habits and other private information of the user. In the process of enforcing a policy with a level of privacy that the customer desires for that information, the service provider can filter out, delete or otherwise eliminate none or some of that information in compliance with the policy such that the communication with the advertiser only includes that information that is in compliance with the established policy.

In another example, further characteristics of products may be gleaned from customer's internet searching. For example, the system may know quite a bit of information about what type of furniture a user's looking for. For example, they may never click on furniture that is white or light oak but only dark wood products. Thus, this kind of information may further provide valuable details regarding the inventory of a business. For example, if the furniture store has a floor model that is a cherry wood bedroom set of bunk beds, can engage in a direct dialog with a user to negotiate a sell price as the user drives or walks by. Thus, particular details regarding user interest may be used in an enhanced way to match with business interest inventory and so forth. In this regard, the system may provide on a cell phone a picture of the floor model of the furniture and ask the user if they are willing to buy it for a particular price of say $599. The system may enable the user to engage in a dialog in which they will offer $499 and basically engage in an automated personalized negotiation for the sale of the products. Of course ancillary information may be provided such as details regarding condition of the product whether it is new, whether there is a warranty, delivery options, tax and so forth.

An aspect of the present invention enables a networking company to match up advertisers with customers through different devices at different locations. An example of this strategy is the 3-screen strategy employed by AT&T. This is able to help customers through the web, the television and the cell phone and be able to link the three together. This is a next generation approach to advertising to a user. As has been noted above, in one aspect of this 3-screen approach, a customer can use their cell phone as a remote control. The advantage of that is that the cell phone with its communication link to a network may provide information regarding what television stations are being watched and does not have to guess by the fact that this particular station, such as ESPN®, and it will know which user at home is likely watching the particular station. So one particular user might get a Ford commercial while another user may get a Volvo® commercial. A daughter may receive a totally different commercial altogether from a son. The same person may even receive different commercials depending on the time of day, month, or year, if demand for an advertised product is cyclical. If different people use their different cell phones for controlling the television, although several people may be watching the same station, the system may know who is the controlling the station selection. In other words, the father may be watching ESPN and get a particular commercial because the father's cell phone is being used to change stations, whereas if the son is watching the same television program the next night, he may get a completely different set of commercials because of the fact that his cell phone is the one that is being used to change stations.

Figure 6:
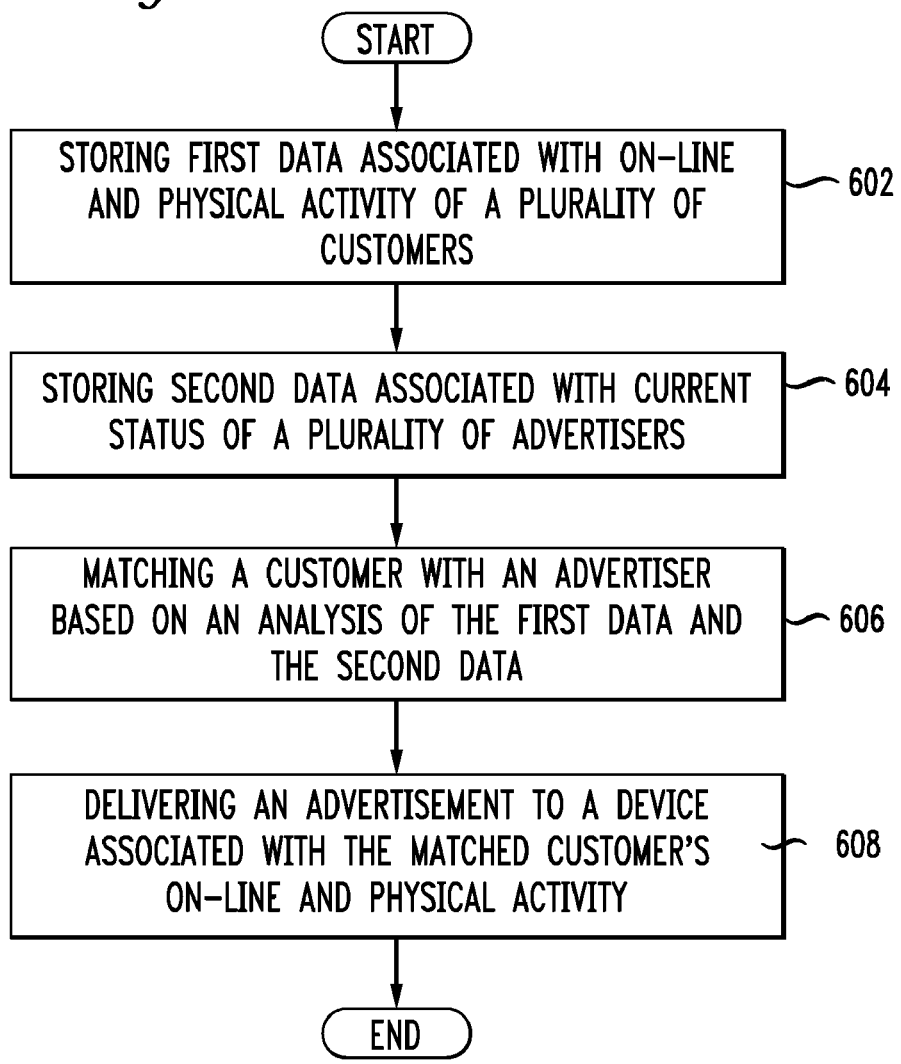
FIG. 6 illustrates a method embodiment of the invention.

By linking this information with one of the Yellow Page customers, as the father or the son drives by a Ford dealership, they may get a coupon for $500 if he stops by the next day. Because the Yellow Page advertisement information allows a networking company to know and to target that information in the Yellow Pages, they know that they are a potential advertiser for a particular business. What they can then do with this potential advertiser is tell the advertiser in advance what customers are in what area and use that as a sales tool to help sign them up for these commercials. FIG. 6 illustrates a method embodiment of the invention. As is shown in this figure, the method includes storing first data associated with online and physical activity of a plurality of customers (602), storing second data associated with a current status with plurality of advertisers (604), matching a customer with an advertiser based on the analysis of the first data and the second data (606) and delivering an advertisement to a device associated with the matched customers online and/or physical activity (608). As has been noted above, there are additional features associated with the method embodiment of the invention. For example, the online activity may be one of web browsing, television watching or mobile device activity. The customer's physical activity may be derived from multiple devices and through multiple sensors such as GPS, temperature sensors, fingerprint sensors, and so forth. The physical activity may be obtained via multiple devices and multiple sensors. The status of plurality of advertisers may comprise at least one of the availability of special other available inventory, budget, time of day, season, and so forth. For example, there may be information associated with the knowledge that the user of a cell phone or of a person browsing the web observes specific holidays may be known such that advertisements may be presented to the user. Furthermore, clearly such information may be of value to particular businesses that may cater to particular cultures or particular religions.

The analysis of the data may also include assigning a value to a portion of the first data that is associated with probable interest of a customer in a particular product or service based on their activities. For example, if a user surfs the web only casually for a vehicle then a low probability may be assigned to that customer profile such that relatively speaking an auto dealership that they may be walking near may decline to advertise to them inasmuch as they do not feel the cost for that advertisement may be realized. Delivery of the advertisement to the matched customer's device may further include engaging in a two way dialog with a customer on a sale of the product or service in the advertisement. If the customer is located within a certain distance of an advertiser based on location information of the device the method may include notifying the advertiser an opportunity to deliver an advertisement to the local customer and prior to delivering the advertisement, receiving authorization from the advertiser either manually or through an automatic algorithm to deliver the advertisement to the device of the local customer. The price for the authorized advertisement may also be negotiated based on the analysis of the first data. For example, if the first data indicates a low probability of the user actually buying product inasmuch as it was only based on a casual surfing of the internet, then the cost of the advertisement may be low. Another aspect, if the user has been surfing the web constantly for a long time and has looked at numerous dark wood bunk beds, then the cost for an advertisement of a dark wood bunk bed that may be a floor model on sale may be relatively high for a furniture store. Thus, there may be a number of parameters associated with the first data that may increase its value in terms of being used as a basis for sending a targeted advertisement to a customer. For example, as has been noted above, the specificity of information associated with the customer profile (ie, the color of wood that the customer desires versus more general information that the user is interested in bedroom furniture), the intensity of the search of the customer profile associated with a particular product or service and so forth. Accordingly, the price for the advertisement may be based upon the value assigned to the portion of the first data.

Additionally, if a customer's purchasing habits indicate a preference for the lowest price items, that preference could be taken into account when advertising a custom price to that individual. If a customer habitually purchases items of one brand, like GE® or Phillips®, then the advertisement may accentuate brands that are familiar to the customer. If a customer prefers luxury items at full price instead of bargain-basement priced items, the advertisement could advertise relevant luxury items without worrying about providing a special discount or other promotion.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such tangible computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a non-tangible computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the data used to price advertisements and determine whether an advertisement should be sent may be automatically transmitted to a central location from a defective appliance or vehicle or based on a service event such as time since last service or a problem. Accordingly, the appended claims and their legal equivalents should only define the invention, rather than any specific examples given.

We claim:

1. A method comprising:
    storing physical activity of a user, wherein the physical activity is detected independent of a user location;
    storing a current status of each of a plurality of advertisers;
    matching, via a processor, a user with a desired advertiser from the plurality of advertisers based on an analysis of the physical activity and the current status; and
    delivering an advertisement from the desired advertiser to a device of the user.

2. The method of claim 1, further comprising storing on-line activity of the user.

3. The method of claim 2, wherein matching the user further comprises matching the user based on the physical activity, the current status and the on-line activity.

4. The method of claim 2, wherein the on-line activity is web browsing.

5. The method of claim 2, wherein the on-line activity is television watching.

6. The method of claim 2, wherein the on-line activity is user interaction with a mobile device.

7. The method of claim 1, wherein the current status of the plurality of advertisers comprises an availability of inventory.

8. The method of claim 1, wherein the current status of the plurality of advertisers comprises a budget.

9. The method of claim 1, wherein the current status of the plurality of advertisers comprises a time of day.

10. The method of claim 1, wherein the current status of the plurality of advertisers comprises a season.

11. The method of claim 1, wherein the physical activity comprises a rate of speed of the user.

12. The method of claim 1, further comprising engaging in a dialog with the user via the device, wherein the dialog relates to at least one of a product and a service in the advertisement.

13. The method of claim 1, wherein the physical activity comprises a direction of movement of the user.

14. The method of claim 1, wherein the physical activity comprises a number of times the user has been near an advertiser within a predetermined period of time.

15. The method of claim 1, wherein a price paid by the desired advertiser for the advertisement is negotiated based on the analysis of the physical activity.

16. The method of claim 1, wherein the physical activity comprises walking.

17. The method of claim 1, wherein the physical activity is detected from a temperature sensor.

18. The method of claim 1, wherein the physical activity is detected from a fingerprint sensor.

19. The method of claim 1, wherein matching the user with the desired advertiser further comprises communicating only portions of the physical activity that are in compliance with a policy of the desired advertiser.

20. A system comprising:
    a processor; and
    a computer-readable medium storing instructions that, when executed by the processor, perform a method comprising:
        storing physical activity of a user, wherein the physical activity is detected independent of a user location;
        storing a current status of each of a plurality of advertisers;
        matching, via a processor, a user with desired advertiser from the plurality of advertisers based on an analysis of the physical activity and the current status; and
        delivering an advertisement from the desired advertiser to a device of the user.

* * * * *